United States Patent
Chowdhary et al.

(10) Patent No.: US 9,267,834 B2
(45) Date of Patent: Feb. 23, 2016

(54) SYSTEM EFFECTIVE TO MONITOR AN AMOUNT OF CHEMICALS IN PORTABLE CONTAINERS

(75) Inventors: Manjit Chowdhary, Missouri City, TX (US); Walter White, Houston, TX (US); Bobby Hyatt, Angleton, TX (US)

(73) Assignee: Economy Polymers & Chemicals, Houston, TX (US)

( * ) Notice: Subject to any disclaimer, the term of this patent is extended or adjusted under 35 U.S.C. 154(b) by 298 days.

(21) Appl. No.: 13/205,961

(22) Filed: Aug. 9, 2011

(65) Prior Publication Data

US 2013/0038455 A1   Feb. 14, 2013

(51) Int. Cl.
*G08B 21/00* (2006.01)
*G01F 23/284* (2006.01)

(52) U.S. Cl.
CPC .................................. *G01F 23/284* (2013.01)

(58) Field of Classification Search
CPC ........... G07C 9/00103; G07C 9/00309; G07C 9/00182; G01F 23/0069; G01F 23/284; G01F 23/2967
USPC ...................... 340/612, 12.22, 12.5
See application file for complete search history.

(56) References Cited

U.S. PATENT DOCUMENTS

| | | | | | |
|---|---|---|---|---|---|
| 5,767,775 | A | * | 6/1998 | Shukla | B01F 13/0818 200/220 |
| 7,671,753 | B2 | * | 3/2010 | Kinsey, III | G06Q 10/00 340/580 |
| 8,400,320 | B2 | * | 3/2013 | Santos | G01F 23/0076 340/501 |
| 8,665,083 | B2 | * | 3/2014 | Easley | G08B 25/10 340/511 |
| 2003/0054963 | A1 | | 3/2003 | Chowdhary et al. | |
| 2005/0062590 | A1 | | 3/2005 | Lang et al. | |
| 2008/0303648 | A1 | * | 12/2008 | Day | B60D 1/62 340/431 |
| 2010/0023162 | A1 | * | 1/2010 | Gresak | B67D 7/08 700/241 |

FOREIGN PATENT DOCUMENTS

EP        1760439 A2 *  3/2007    ............. B60P 3/227

* cited by examiner

*Primary Examiner* — George Bugg
*Assistant Examiner* — Anthony D Afrifa-Kyei
(74) *Attorney, Agent, or Firm* — Dilworth & Barrese, LLP

(57) ABSTRACT

A system and method effective to monitor an amount of material in a portable container. The system may comprise a material and sensor in a container. The sensor is effective to detect a first level of the material when the container is at a first location and to generate a first data signal in response. The sensor is effective to detect a second level of the material in the container when the container is at a second location and to generate a second data signal in response. The sensor is further effective to send the first and second data signal to a processor. The processor is effective to receive the first and second data signal and generate a report based on the first and the second data signal, the report relating to an amount of the material in the container.

21 Claims, 2 Drawing Sheets

SYSTEM EFFECTIVE TO MONITOR AN AMOUNT OF CHEMICALS IN PORTABLE CONTAINERS

BACKGROUND OF THE INVENTION

1. Field of the Invention

This disclosure relates to a system and method for monitoring chemicals, such as fracturing chemicals, agriculture chemicals or any other related industries, stored in portable containers.

2. Description of the Related Art

In a subterranean stimulation formation process, such as fracturing, one or more chemicals may be applied to a subterranean formation. The chemicals may each be stored in respective containers. As the formation process continues, an amount of each chemical in a respective container will change. Eventually, at least some of these chemicals may need to be replenished.

SUMMARY OF THE INVENTION

One embodiment of the invention is a system effective to monitor an amount of material in a portable container. The system comprises a container, a material in the container and a sensor in the container. The sensor is effective to detect a first level of the material in the container when the container is at a first location and to generate a first data signal based on the first level, detect a second level of the material in the container when the container is at a second location and to generate a second data signal based on the second level, and send the first and second data signal to a processor. The system includes a processor in communication with the sensor, the processor effective to receive the first and second data signal and effective to generate a report based on the first and the second data signal, the report relating to an amount of the material in the container.

Another embodiment of the invention is a method for monitoring an amount of material in a portable container. The method comprises detecting, by a sensor, a first level of material in a container when the container is at a first location. The method further comprises generating, by the sensor, a first data signal based on the first level. The method further comprises detecting, by the sensor, a second level of the material in the container when the container is at a second location. The method further comprises generating, by the sensor, a second data signal based on the second level. The method further comprises receiving, by a processor in communication with the sensor, the first and the second data signal. The method further comprises generating a report based on the first and the second data signal, the report relating to an amount of the material in the container.

Another embodiment of the invention is a system effective to monitor an amount of material in a portable container. The system comprises a truck, the truck including a cab and a trailer. The system further comprises a container in the trailer. The system further comprises a material in the container. The system further comprises a sensor in the container, the sensor effective to detect a first level of the material in the container when the container is at a first location and to generate a first data signal based on the first level, detect a second level of the material in the container when the container is at a second location and to generate a second data signal based on the second level, and send the first and second data signal to a processor. The system further comprises a first processor in the cab, the first processor in communication with the sensor, the first processor effective to receive the first and second data signal and effective to generate a report based on the first and the second data signal, the report relating to an amount of the material in the container. The first processor effective to send the report over a network to a second processor.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

DETAILED DESCRIPTION OF THE PREFERRED EMBODIMENT(S)

Figure 1:
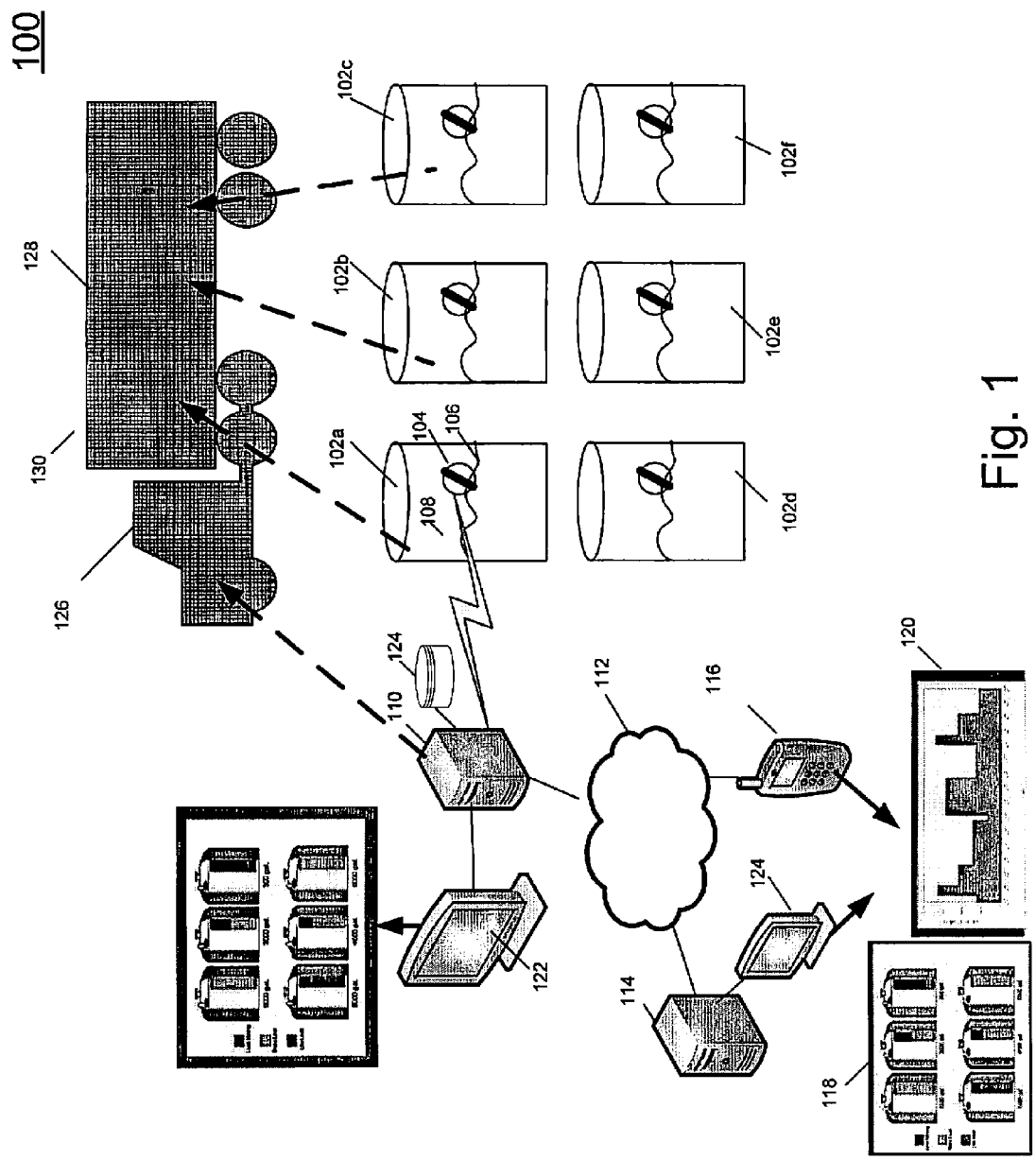
FIG. 1 is a system drawing of a monitoring system in accordance with an embodiment of the invention.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Referring to FIG. 1, there is shown a system 100 effective to monitor an amount of chemicals in portable containers in accordance with an embodiment of the invention. System 100 includes one or more containers 102, a processor 110, and a network 112. Focusing on container 102a, as illustrative of the containers shown, each container 102 may include a level sensor 104 and a chemical material 106. Chemical material 106 may be a material used in a subterranean formation stimulation process such as fracturing. Material 106 may include, for example, a carrier fluid, a polymer such as guar, a cross-linker, a propping agent, non-emulsifiers, formation cleaners, acids, bases, buffers, oxidizers, polymer slurries, enzymes, friction reducers, breakers, temperature stabilizers, boron, zirconium, titanium cross inkers, scale inhibitors, oxygen scavengers, hydrogen sulfide scavengers, chemicals used in fracturing, drilling or agriculture, etc. Level sensor 104 may be effective to monitor a level of chemical material 106 in container 105. For example, level sensor 104 may be a MASSA M-3 level sensor in a chemical resistant housing with NATIONAL PIPE TAPER threads such as a MAGNETROL MODEL R82-516-011 radar head, etc. Level sensor 104 may include an antenna and be capable of sending a spread spectrum radio signal indicative of a level of material 106 in container 102. In an example, sensor 104 may be effective to send a data signal through a communication link 108 to processor 110 every about 0.5 to about 60 seconds indicating a level of material 106 in container 102. Sensor 104 may be powered by lithium batteries.

As containers 102 may be portable, processor 110 may receive data signals relating to levels of material 106 when container 102 is at more than one location. Processor 110 may process these data signals and generate a report, such as on display 122, indicating an amount of material in container 102.

Communication link 108 may include wireless communication and/or wired communication. Processor 110 may be a master monitoring panel in communication with a display 122. Processor 110 may include a WST-200 radio monitor such as those available from NTE AUTOMATION. The radio monitor may be effective to receive data through communication link 108 and can thereby enable communication between processor 110 and containers 102. Processor 110 may generate a report on display 122 including a graphical image indicating amounts of material 106 in containers 102 at multiple times and/or locations. The graphical image may indicate an amount of material 106 in container 102, whether the amount of material is changing, whether the amount of material is static, and whether the amount is below a threshold percentage indicating that the material should be replenished.

Processor 110 may also send data relating to amounts of materials 106 over network 112 to a processor such as a user's phone and/or processor 114 so that the processor 112, 114 may be able to generate applicable reports 118, 120. Network 112 may include, for example, a cellular network including cell towers, a satellite network, or direct communication. Network 112 may include the Internet network and communication could be through, for example, TCP/IP (transfer connect protocol/internet protocol).

Processor 110 may be in communication with a memory 124. Memory 124 may include a list of containers and threshold amounts. When processor 110 determines that an amount of a material in a particular container has dropped below the respective threshold, based on communication with memory 124, processor 110 may generate an alarm. Processor 110 may send the alarm over network 112 to a processor such as smart phone 116 or processor 114. For example, processor 110 may generate a phone call and/or text message based on the alarm. A user may view data processed by processor 110 on a display 124 through a web interface using processor 114. For example, information regarding a last delivery to a container, the delivery amount, and container level or amount history, may be displayed on display 124 by processor 114.

System 100 may be used with a truck 130 including a cab 126 and trailer 128. Processor 110 may be placed in a cab 126 of truck 130 and containers 102 may be placed in trailer 128. Processor 110 may communicate with a positioning system such as a GPS (global positioning system) and thus monitor a location of cab 126 and amounts of materials 106 in containers 102. In examples where truck 130 is used, when cab 126 is in range of sensor 104 in container 102, processor 110 may record an identifier of trailer 128 so that processor 110 may keep track of which cab 126 is attached to which trailer 128. As truck 130 moves, processor 110 may generate information regarding a location of truck 130 over time. As amounts of material 106 are also monitored, processor 110 may generate a map of where truck 130 has travelled and when and where containers 102 were filled and/or emptied.

Among other benefits, using a system in accordance with this disclosure a user can realize inventory control of materials anywhere in the world. A system may use bulk storage of chemicals reducing a footprint of a fracturing job. Inventory management may be performed at all stages of a fracturing process. Inventory records may be kept for years and may be reconciled. Customers may be invoiced quicker. A fracturing job may be safer with fewer spills as fewer hose connections need to be made. Freight charges may be reduced. Inventory adjustments and write offs, man hours, trailer fleet rental, third party hauling, tote disposal, and partial tote handling, may be reduced. In an example, a system may measure 200 different portable containers. Measurement may be made with an accuracy of about 0.05%.

Figure 2:
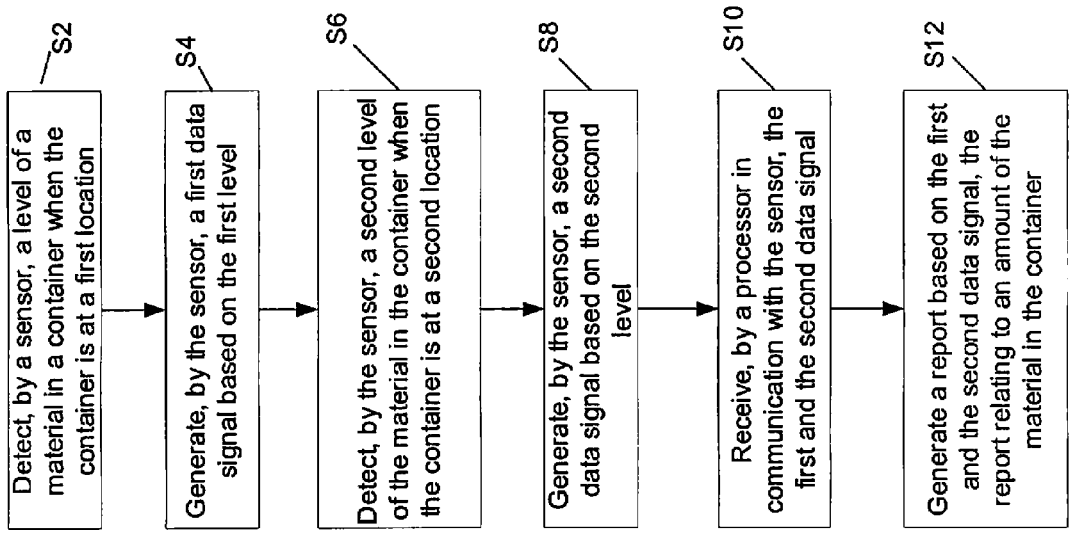
FIG. 2 is a flow diagram illustrating a process which could be performed in accordance with an embodiment of the invention.

Referring to FIG. 2, there is shown a process which could be performed in accordance with an embodiment of the invention. The process could be performed using, for example, system 100 discussed above.

As shown, at step S2, a sensor may detect a level of a material in a container when the container is at a first location.

At step S4, the sensor may generate a first data signal based on the first level.

At step S6, a sensor may detect a level of a material in a container when the container is at a second location.

At step S8, the sensor may generate a second data signal based on the second level.

At step S10, a processor in communication with the sensor may receive the first and the second data signal.

At step S12, the processor may generate a report based on the first and the second data signal, the report relating to an amount of the material in the container.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system effective to monitor amounts of materials in a plurality of portable containers located on a single transport vehicle, the system comprising:
   a plurality of containers in a trailer of the single transport vehicle, the single transport vehicle including a cab that hauls the trailer;
   a material in each of the containers;
   a sensor in each of the containers, each sensor effective to
      detect a first level of the material in a respective container when the container is at a first location and to generate a first data signal based on the first level,
      detect a second level of the material in the respective container when the container is at a second location and to generate a second data signal based on the second level, and
      send the first and second data signal from each of the plurality of containers to a processor; and
   a processor in communication with the sensors, the processor effective to:
      receive the first and second data signal from each of the plurality of containers, determine a change in a level of material in at least one container, and when a level in at least one container changes, generate a report based on the first and the second data signal from each of the plurality of containers, the report including the amount of material in each of the plurality of containers and their geographic location; and the map indicating where the truck has travelled and when and where the level in at least one container in the trailer changes; and
      associate an identifier with the trailer of the single transport vehicle when the cab is in range of the sensor, the identifier indicating which cab is attached to the trailer.

2. The system as recited in claim 1, wherein the processor is in communication with the sensor over a wireless link.

3. The system as recited in claim 1, wherein the processor is in communication with a database and the processor is effective to generate an alarm when the first amount is below a threshold.

4. The system as recited in claim 1, wherein the processor is effective to send the report over a network to a phone.

5. The system as recited in claim 1, wherein:
the processor is a first processor;
the system further comprises a second processor;
the first processor is effective to send the report over a network to the second processor; and
the second processor is effective to display the report on a display.

6. The system as recited in claim 5, wherein the second processor is effective to communicate with the first processor using a web interface.

7. The system as recited in claim 1, wherein the report includes the first and the second amount.

8. The system as recited in claim 1, wherein the report includes an indication of a change between the first and the second amount.

9. The system as recited in claim 1, wherein the processor is in a cab of a truck and the container is in a trailer of the truck.

10. The system as recited in claim 9, wherein the report includes a map indicating a location of the truck and a change between the first and the second amount.

11. A method for monitoring amounts of materials in a plurality of portable containers located on a single transport vehicle, the method comprising:
detecting, by a sensor positioned in each of the plurality of containers, a first level of material in a respective container when the container is at a first location;
generating, by the sensor, a first data signal based on the first level;
detecting, by the sensor, a second level of the material in the respective container when the container is at a second location;
generating, by the sensor, a second data signal based on the second level;
receiving, by a processor in communication with the sensor, the first and the second data signal from each of the plurality of containers;
determining a change in a level of material in at least one container, and
when a level in at least one container changes, generating a report based on the first and the second data signal from each of the plurality of containers, the report including the amount of material in each of the plurality of containers and their geographic location;
when the level in at least one container drops below a threshold, generating, by the processor, an alarm that includes at least one of a phone call and a text message to a phone of a user; and
generating, by the processor, a map of where the single transport vehicle travelled, the map including information regarding when and where the level in at least one container changes.

12. The method as recited in claim 11, further comprising:
determining by the processor that the first amount is below a threshold; and
generating an alarm by the processor.

13. The method as recited in claim 11, wherein:
the processor is a first processor; and the method further comprises
sending the report over a network from the first processor to a second processor; and displaying the report on a display by the second processor.

14. The method as recited in claim 11, wherein the report includes the first and the second amount.

15. The method as recited in claim 11, wherein the report includes an indication of a change between the first and the second amount.

16. A system effective to monitor amounts of materials in a plurality of portable containers located on a single transport vehicle, the system comprising:
a truck, the truck including a cab and a trailer;
the plurality of containers in the trailer;
a material in each of the containers;
a sensor in each of the containers, the sensor effective to
detect a first level of the material in a respective container when the container is at a first location and to generate a first data signal based on the first level,
detect a second level of the material in the respective container when the container is at a second location and to generate a second data signal based on the second level, and
send the first and second data signal from each of the plurality of containers to a processor; and
a first processor in the cab, the first processor in communication with the sensors, the first processor effective to receive the first and second data signals, determine a change in a level of material in at least one container based on a comparison between the first and second data signals, generate a report and a map based on the first and the second data signal from each of the plurality of containers when a level in at least one container changes, the report including the amount of material in each of the plurality of containers and their geographic location, and the map indicating where the truck has travelled and when and where the level in at least one container in the trailer changes; and
send the report over a network to a second processor;
associate an identifier with the trailer of the truck when the cab is in range of the sensor, the identifier indicating which cab is attached to the trailer.

17. The system as recited in claim 16, wherein the processor is in communication with a database and the processor is effective to generate an alarm when the first amount is below a threshold.

18. The system as recited in claim 16, wherein the report includes the first and the second amount.

19. The system as recited in claim 16, wherein the report includes a map indicating a location of the truck and a change between the first and the second amount.

20. A system effective to monitor amounts of materials in a plurality of portable containers located on a single transport vehicle, the system comprising:
a plurality of containers in a trailer of the single transport vehicle, the single transport vehicle including a cab that hauls the trailer;
a material in each of the containers;
a sensor in each of the containers, each sensor effective to
detect a first level of the material in a respective container and to generate a first data signal based on the first level,
detect a second level of the material in the respective container and to generate a second data signal based on the second level, and
send the first and second data signal from each of the plurality of containers to a processor; and
a processor in communication with the sensors, the processor effective to constantly monitor the levels of the materials in each of the plurality of containers, determine a change in a level of material in at least one container based on a comparison between the first and second data signals, when a level in at least one container changes, generate a report and a map based on the first and the second data signal from each of the plurality of containers, the report including the amount of material in each of the plurality of containers and their geographic location and the map indicating where the single transport vehicle has travelled and when and where the level in at least one container in the trailer changes, associate an identifier with the trailer of the truck when the cab is in range of the sensor, the identifier indicating which cab is attached to the trailer, and transmit the report to a remote location to alert a user of the change in the level of the material.

21. The system effective to monitor amounts of materials in a plurality of portable containers located on a single transport vehicle of claim 20, wherein the processor is programmable from a remote location to set or change monitoring intervals of at least one of the time to detect amounts of materials in the plurality of containers, location of the transport vehicle, amounts of materials in the plurality of containers, and an amount of change in an amount of materials in any one of the plurality of containers.

* * * * *